(12) United States Patent
Boston

(10) Patent No.: US 6,990,768 B1
(45) Date of Patent: Jan. 31, 2006

(54) DEVICE FOR ELIMINATING MOSQUITOS

(76) Inventor: Thomas William Boston, 11255 Garland Rd., Suite 1302-247, Dallas, TX (US) 75218

( * ) Notice: Subject to any disclaimer, the term of this patent is extended or adjusted under 35 U.S.C. 154(b) by 0 days.

(21) Appl. No.: 10/818,325

(22) Filed: Apr. 5, 2004

(51) Int. Cl.
*A01M 1/20* (2006.01)

(52) U.S. Cl. .................. 43/132.1; 43/107; 119/69.5

(58) Field of Classification Search ............... 43/107, 43/111, 132.1, 133, 122; 119/69.5
See application file for complete search history.

(56) References Cited

U.S. PATENT DOCUMENTS

| | | | |
|---|---|---|---|
| 3,997,999 A | 12/1976 | Evans | |
| 4,328,636 A * | 5/1982 | Johnson | 43/107 |
| 5,325,625 A * | 7/1994 | Liu et al. | 43/114 |
| 5,369,908 A * | 12/1994 | Morales | 43/111 |
| 5,425,197 A * | 6/1995 | Smith | 43/113 |
| 5,815,980 A | 10/1998 | Clarke, Jr. | |
| 5,896,697 A * | 4/1999 | Kang | 43/133 |
| 5,926,997 A * | 7/1999 | Wilcox | 43/60 |
| 6,077,521 A | 6/2000 | Hammond et al. | |
| 6,112,453 A | 9/2000 | Clarke, Jr. | |
| 6,185,861 B1 * | 2/2001 | Perich et al. | 43/107 |
| 6,338,220 B1 * | 1/2002 | Dicks | 43/132.1 |
| 6,362,235 B1 | 3/2002 | Nolen et al. | |
| 6,389,740 B2 | 5/2002 | Perich et al. | |
| 6,425,202 B1 | 7/2002 | Lin et al. | |
| 6,708,443 B2 * | 3/2004 | Hall | 43/107 |
| 2001/0000059 A1 | 3/2001 | Perich et al. | |

* cited by examiner

*Primary Examiner*—Kurt Rowan
(74) *Attorney, Agent, or Firm*—Molly D. McKay

(57) ABSTRACT

An electrically operated, self contained device that eliminates mosquitos by attracting the mosquitos to lay their eggs in trays of water provided in the device and periodically filtering the eggs from the water. The eggs that have been filtered out of the water are then mechanically destroyed by crushing them. The filtered water is recycled to a water supply tank for reuse in refilling the trays of water in the device.

10 Claims, 6 Drawing Sheets

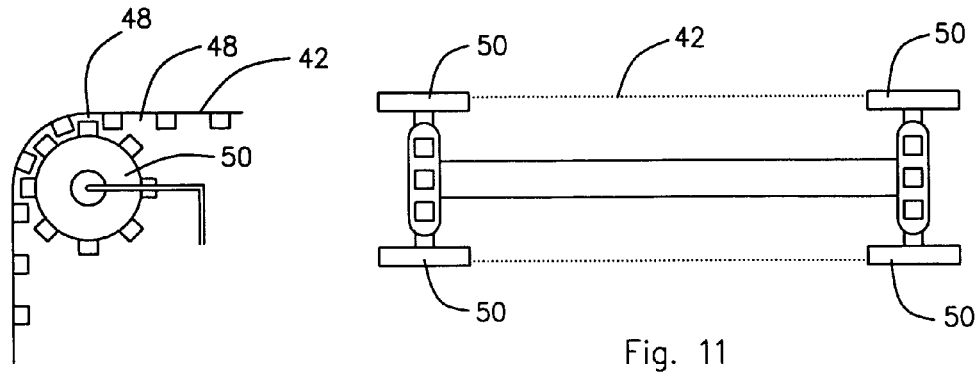
Fig. 14
Fig. 11
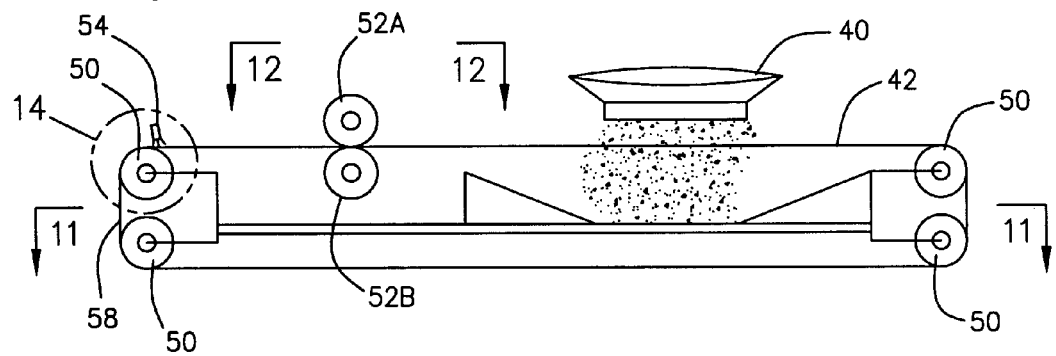
Fig. 10
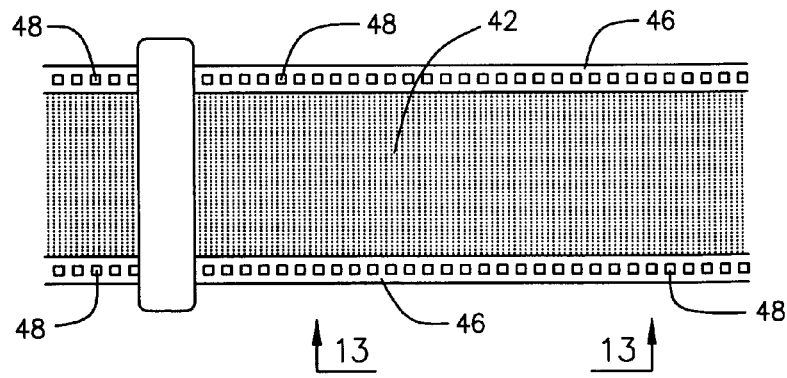
Fig. 12
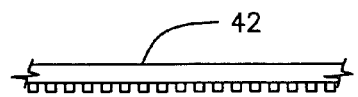
Fig. 13

DEVICE FOR ELIMINATING MOSQUITOS

BACKGROUND OF THE INVENTION

1. Field of the Invention

The present invention relates to a device for eliminating mosquitos by attracting them to lay their eggs within the device in trays of water that are provided for this purpose. Periodically, the trays are dumped of their contents, and the content is filtered to remove the eggs from the water. The eggs are then crushed and disposed of, with the filtered water being recycled for reuse in the device.

2. Description of the Related Art

Mosquitos cause more human suffering than any other organism with over one million people dying each year from mosquito-borne diseases. According to the World Health Organization, malaria alone affects 400 million people each year. About 1,200 Americans are infected with malaria each year, most while traveling abroad. Malaria is a tropical disease and is most severe in Africa where it kills two million people each year either directly or in combination with acute respiratory infections. In approximately the past decade, dengue hemorrhagic fever emerged in Latin America and has reached as far north as the Texas border. Mosquitos have contributed to the spread of West Nile disease over the United States in just three years.

Various methods and devices have been proposed for killing or reducing the population of mosquitos or at least to prevent them from bothering the human population with their presence. Each of these methods and devices has its own unique set of problems or limitations.

One such method is to trap the mosquitos or mosquito larvae in a device that does not permit the mosquitos from exiting the device, thereby causing the mosquitos to die within the device. One obvious limitation with this method is that not all of the mosquitos will be trapped, and those that are not trapped will continue to breed and replenish the mosquito population that is available to bite humans.

Another method is to add some type of organic chemical, such as for example alcohol or oil, to bodies of water in which the mosquitos breed to kill the larvae. The organic chemical floats on the top of the water and prevents the larvae from reaching the air, thereby causing the larvae to suffocate. This method is limited in use because it is only effective for use in still bodies of water, not flowing water which disrupts the oil layer so that mosquito larvae do not suffocate. Also, the addition of alcohol or oil to a body of water fouls the water and pollutes it.

Still other methods involve introducing a chemical scent that either repels the mosquitos away from the area where the humans are to be, or alternately, masks the scent of the human to the mosquitos so that they can not locate the humans to bite them. These methods do nothing to reduce the mosquito population and have limited effective range. If a human ventures beyond the limited range of the chemical scent, the mosquitos will be able to locate the human and bite him. This is the same principal used by citronella candles as well as products that are sprayed on the human's body. These sprays that are used on a human's body are known carcinogens and can present a particularly acute health hazard for young children.

Further methods include attracting and then electrocuting the adult mosquitos or alternately using an insecticide to kill them. Electrocution of mosquitos is noisy, and does not kill a significant percentage of the mosquito population, and those mosquitos that are not killed will continue to breed and replenish the mosquito population available to bite humans.

Still a further method is to employ spray insecticides. However, these insecticides can be harmful to humans, animals and the environment, and recently have been found to be ineffective in killing mosquitos because the concentrations allowed for use by the government for human health reasons has allowed the mosquito population to build a resistance to the insecticides. Also, insecticides are not selective and can kill beneficial insects that help in pollination of crops. Finally, insecticides can reach water supplies and contaminate our drinking water.

The present invention is designed to reduce the mosquito population by providing an attractive device into which the mosquitos will be attracted by use of a combination of heat, light and chemical attractants. Once inside, the mosquitos will lay their eggs in trays of water provided for this purpose. The trays will automatically dump periodically and the eggs will be filtered out of the water. The eggs will then be mechanically destroyed and disposed of, and the filtered water will be recycled for reuse in the device. The device is self contained, and is battery powered with optional solar recharging. Thus, the device can be located in remote locations where power and water sources are not readily available. Also, because of the low power usage and reuse of water, the device can operate for extended periods of time without need of servicing. Use of the device allows the reduction and management of the mosquito population below the threshold that would cause disease.

SUMMARY OF THE INVENTION

The present invention is a device for eliminating mosquitos. Specifically, the present invention is a self contained unit with attractants for attracting mosquitos to the unit and causing them to enter the inside of the unit where they lay their eggs in trays of water provided for this purpose. Prior to the time required for mosquito eggs to hatch, the unit automatically dumps the water and eggs from the trays of water. The water and eggs fall downward within the unit and pass through a continuously moving belt filter which filters the eggs from the water. The filtered water is recycled to a water supply tank for reuse in refilling the trays of water in the unit. The eggs that are filtered from the water are retained on the moving belt filter. The egg laden filter first travels between rollers that crush the eggs and any mosquito larvae that are retained on the filter and then travels past a brush that brushes the debris from the filter before the filter travels back to the starting point, i.e. under the area where the mixture of water and eggs falls downward onto the filter after the mixture is dumped out of the trays. The debris that is brushed off of the filter falls into a sludge tank. Liquid from the sludge tank flows to an evaporative tray where the liquid evaporates. To speed up the evaporation, the evaporative tray is heated by sunlight that passes through a magnifying glass panel provided for this purpose.

BRIEF DESCRIPTION OF THE DRAWINGS

FIG. 10 is an enlarged view of the belt filter showing the contents of the trays dumping onto the belt and the belt passing through a pair of rollers where the eggs and larvae that are retained on the belt are crushed.

FIG. 11 is a cross sectional view of the belt filter taken along line 11—11, showing the gear drive mechanism on which the belt travels.

FIG. 12 is an enlarged top view if the rollers taken along line 12—12 of FIG. 10.

FIG. 13 is an enlarged side view of the belt taken along line 13—13 of FIG. 12, showing the openings in the edges of the belt that are engaged by teeth of the drive gears.

FIG. 14 is an enlarged view of the area contained within circle 14 of FIG. 10, showing the teeth of a drive gear engaging the openings provided in the edge of the belt.

DETAILED DESCRIPTION OF THE PREFERRED EMBODIMENT THE INVENTION

Figure 1:
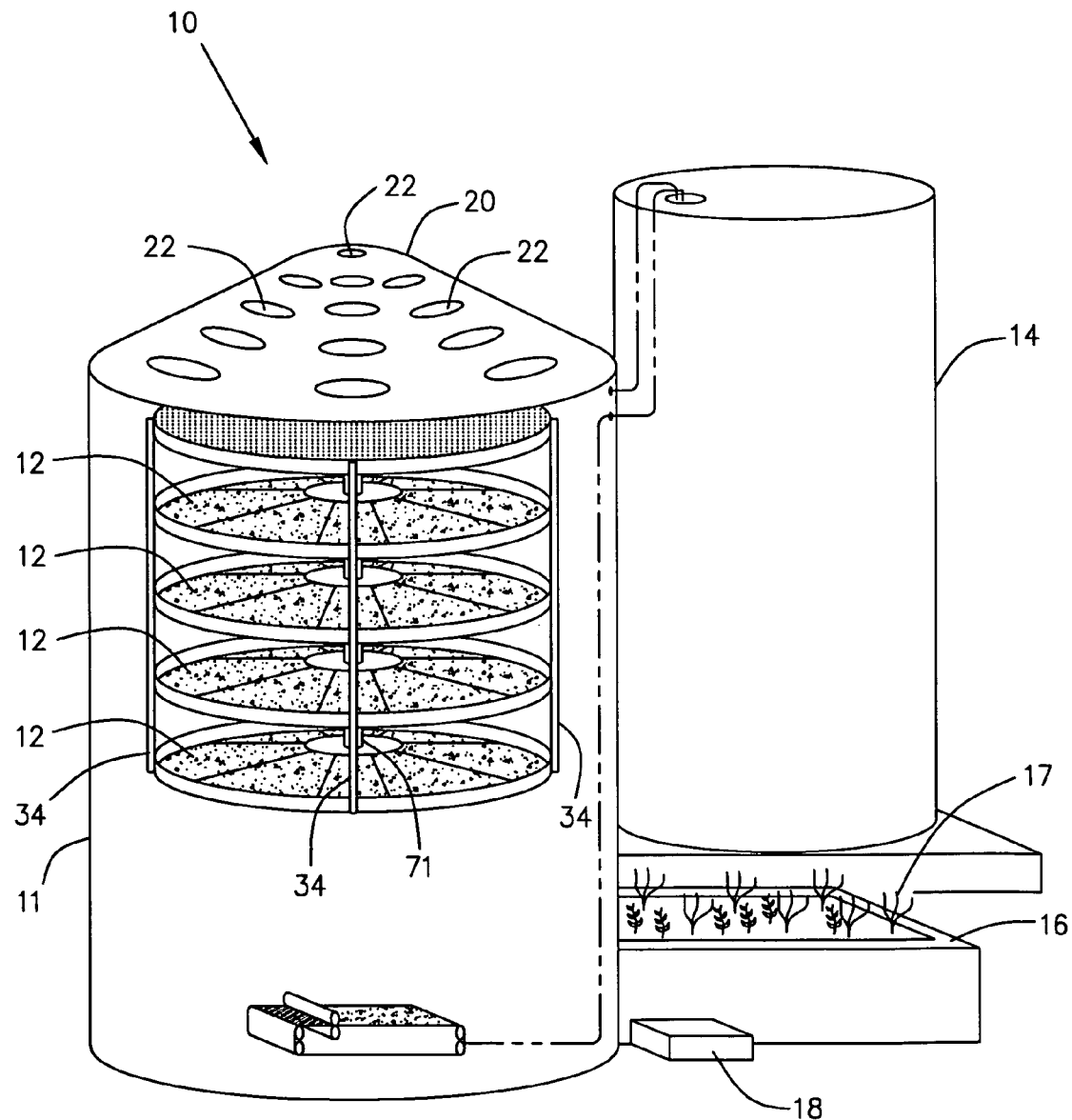
FIG. 1 is a partially cut away perspective view of a device for eliminating mosquitos constructed in according to a preferred embodiment of the present invention.
Figure 3:
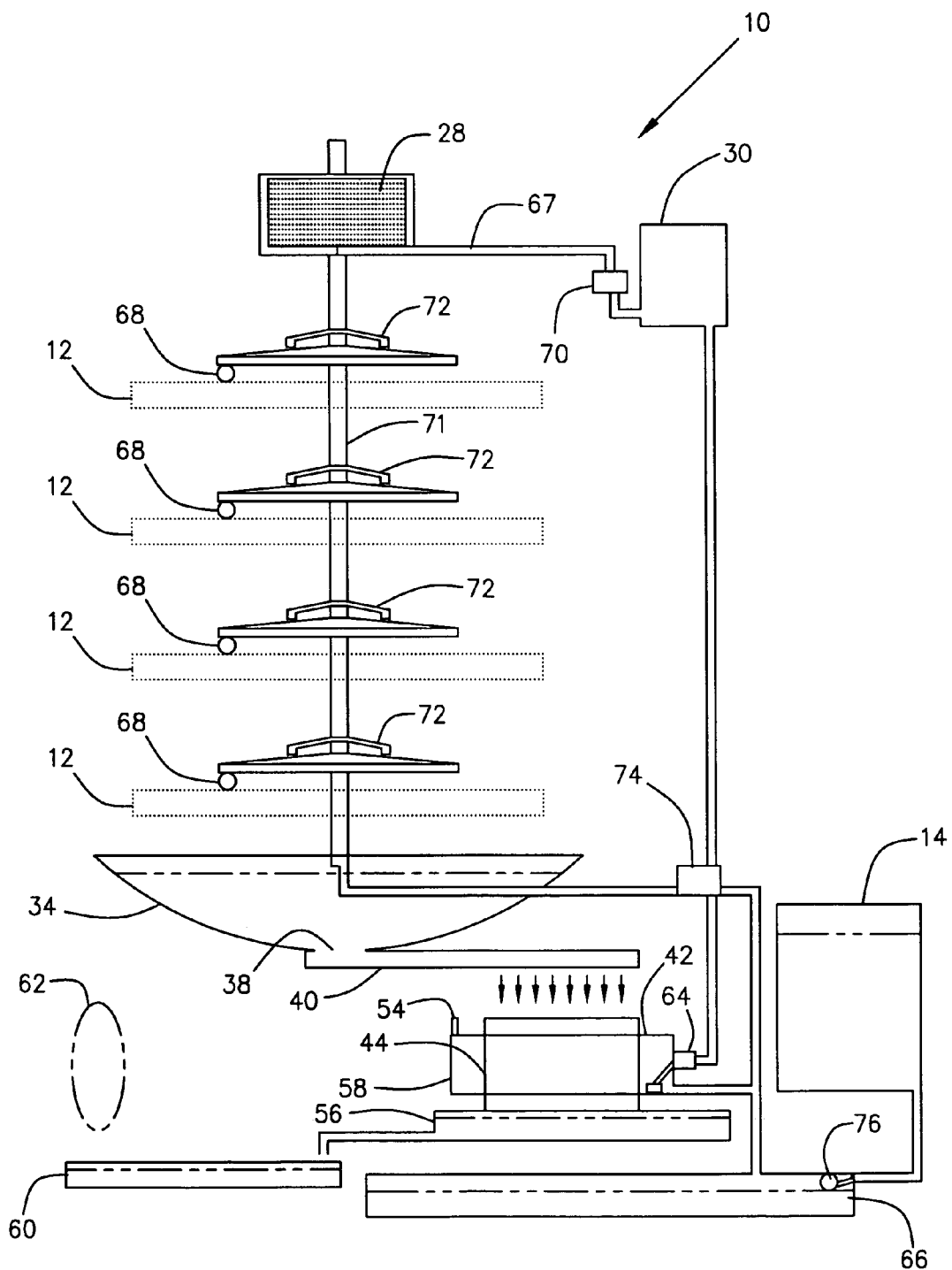
FIG. 3 is a partial diagram showing some of the main components of the device of FIG. 1.

Referring now to the drawings and initially to FIGS. 1 and 3, there is illustrated a device 10 for eliminating mosquitos that is constructed in accordance with a preferred embodiment of the present invention. Specifically, the present invention is a self contained unit 12 that is provided with attractants for attracting mosquitos to the unit 11 and causing them to enter the inside of the unit 11 where they lay their eggs in trays 12 filled with water provided for this purpose. As illustrated in FIG. 1, the unit may be powered by batteries 18 that can optionally be recharged by solar power. A variety of commonly used attractants can be used with the present invention, including commercially available chemical attractants such as carbon dioxide. Also, less commonly used attractants such as dirty socks and limburger cheese have been found effective as attractants for mosquitos. Mosquito repellants can also be used in the areas surrounding the device 10 to drive mosquitos to the device 10. Also to make the device 10 more attractive to mosquitos, heating of the device 10 in the form of passive solar heating is also provided, as will be more fully described hereafter. Finally, a feedbag device can be employed that provides a mixture of non coagulant fluid of animal blood or simulated human plasma administered by use of a container that has simulated skin or animal skin that provides the female mosquitos with a means of obtaining the proteins and chemicals needed to induce egg laying. The use of attractants makes the device 10 a more appealing breeding ground of mosquito farm for the mosquitos.

As illustrated in FIG. 1, the unit 11 is provided with a reserve water storage tank 14 that attaches to the main unit 11 and supplies water to the unit 11. The reserve water tank 14 preferably holds approximately 55 gallons of water. Also, a planter 16 is provided with the unit 11 that contains vegetation 17 that supplies nectar and plant juices, i.e. a main food source for mosquitos, such as for example the small pine trees shown in FIG. 1. Batteries 18 that power the unit 11 are located in a base 20 of the planter 16, with the remainder of the equipment for the device 10 contained within the cylindrical unit 11 shown in FIG. 1.

Referring now to FIGS. 1 and 3, the function of the unit 11 will be described in association with its various components. The cylindrical unit 11 is provided with a dome shaped lid 20. The lid 20 is preferably black or at least dark colored so that sunshine striking the dark lid 20 will cause the unit 11 to be warmed, thereby attracting mosquitos to the heat source. As illustrated in FIG. 1, the dome lid 20 is provided with one or more openings 22 there through to allow mosquitos to enter the unit 11. Once inside, the mosquitos encounter a plurality of trays 12 containing water where the mosquitos will lay their eggs. The trays 12 provided inside the unit 11 are arranged one on top of the other, with adjacent trays 12 spaced apart from each other.

Figure 4:
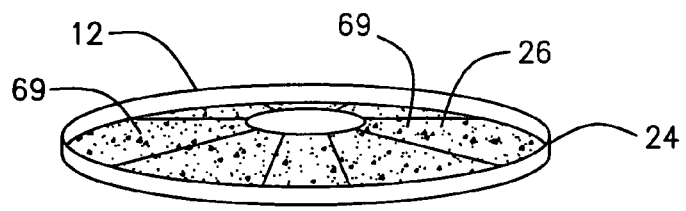
FIG. 4 is a perspective view of one of the trays shown in FIG. 3.
Figure 8:
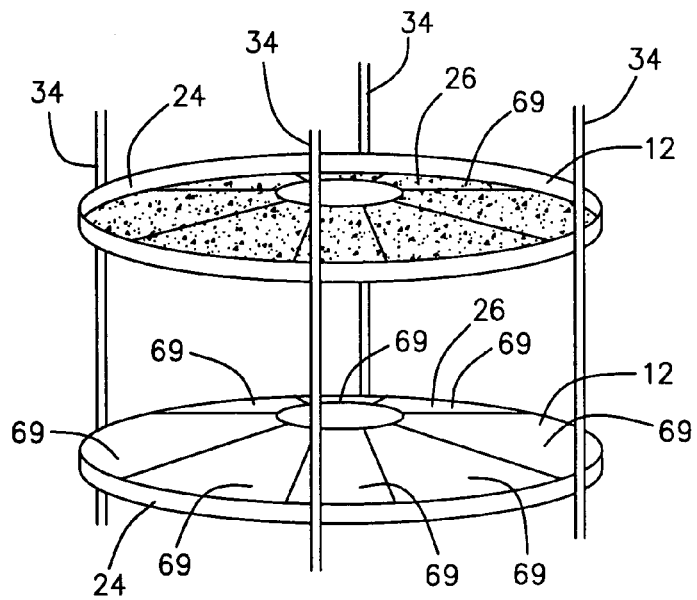
FIG. 8 is a perspective view of one of the trays showing the sloping angle of the tray.

Each tray 12 is provided on its perimeter with a flexible side lip 24, as illustrated in FIGS. 4–6 and 8–9, that can be placed in an upward orientation to hold water on the top 26 of the tray 12, or alternately, can be moved to a downward orientation to dump the water, mosquito eggs, and mosquito larvae that are contained on the top 26 of the tray 12. FIG. 4 and the upper half of FIG. 8 show a tray 12 in its upward orientation, and FIGS. 5 and 9 and the bottom half of FIG. 8 show a tray 12 in a downward orientation.

Figure 2:
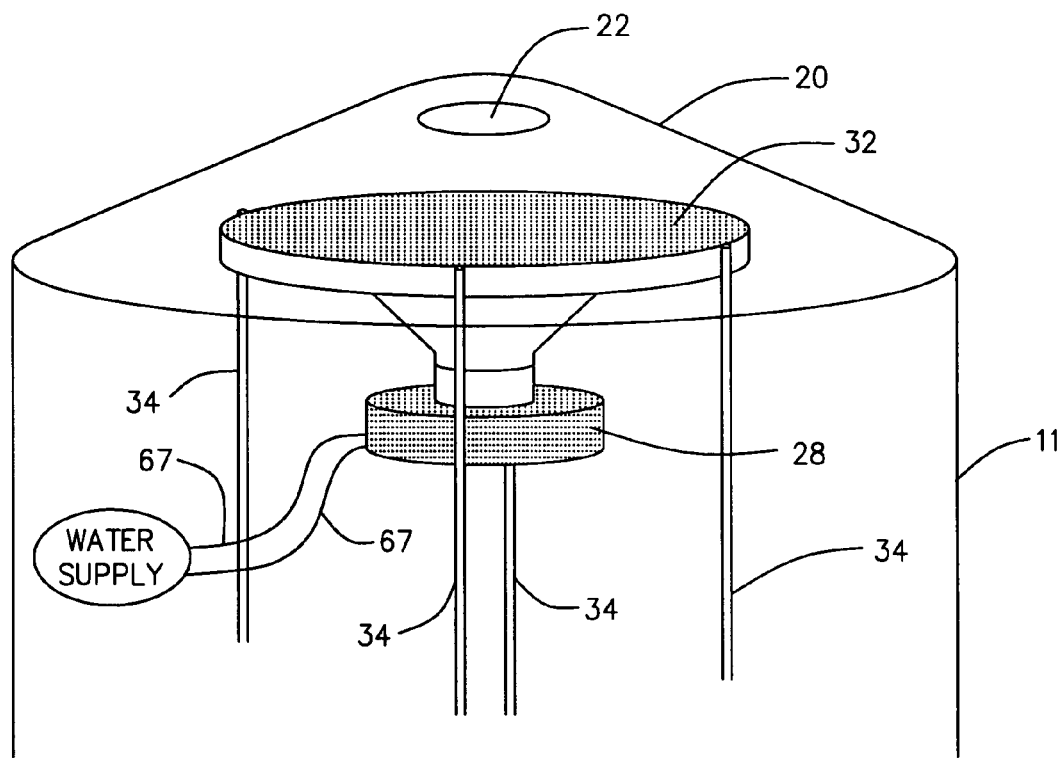
FIG. 2 is a partially cut away view of the dome portion of the device of FIG. 1.
Figure 5:
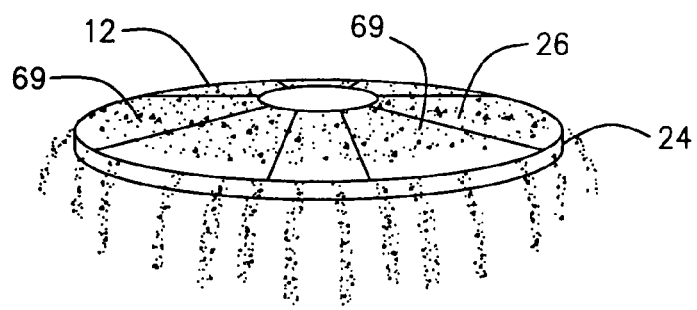
FIG. 5 is a perspective view of the tray of FIG. 4, showing the water and debris being dumped from the tray.
Figure 6:
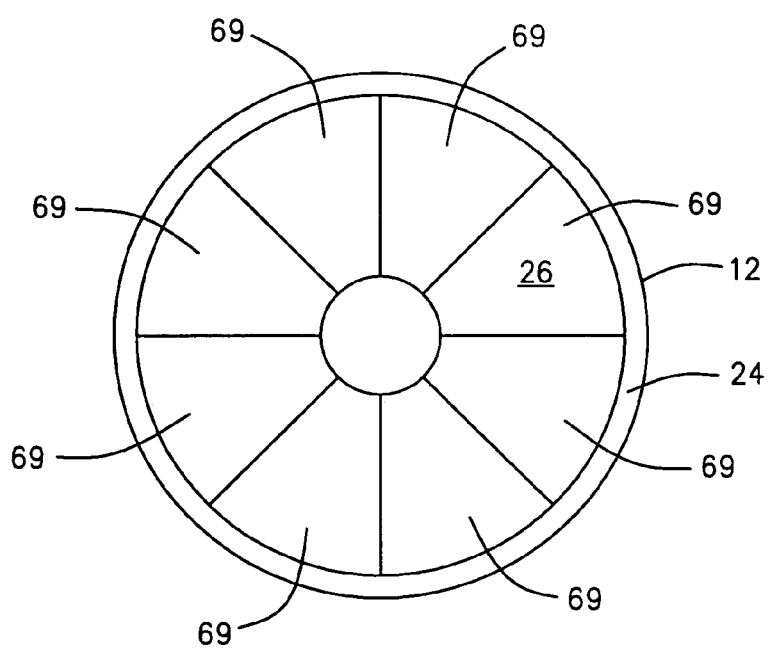
FIG. 6 is a top plan view of the tray of FIG. 5.
Figure 7:
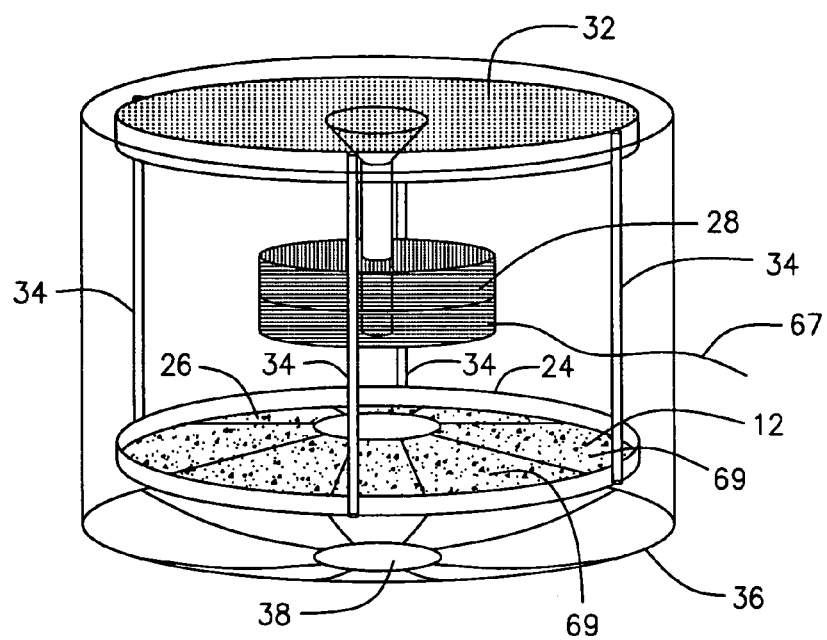
FIG. 7 is a perspective view of the upper portion of the device showing the pancake piston that causes the trays to be dumped periodically of their contents.
Figure 9:
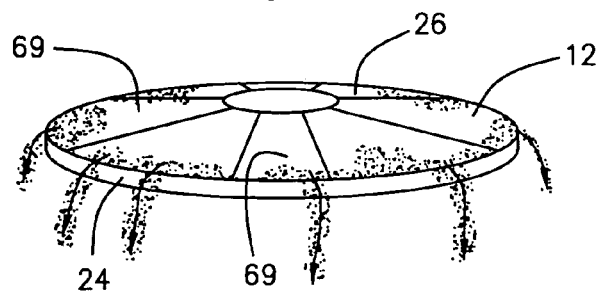
FIG. 9 is a perspective view of the tray of FIG. 8 shown in its dumping position.

As illustrated in FIG. 7, the unit 11 is provided with a pancake cylinder 28 that is periodically activated by a timer 30 provided in the unit 11. The timer 30 is controlled by a microprocessor (not illustrated). Referring also to FIG. 2, the pancake cylinder 28 is attaches via a lift disk 32 to rods 34. The lift disk 32 is shiny on top to insulate against sunlight heating the trays 12 of water. The rods 32, in turn, attach to the flexible side lips 24 of the trays 12. The lift disk 32 also serves to absorb and control radiant heat to inside breeding areas, i.e. the trays 12. When the pancake cylinder 28 is activated, it forces the rods 34 downward, thereby causing the trays 12 to move to their downward orientation and dumping the water and any mosquito eggs or larvae contained in the water. The pancake cylinder 28 is activated by the timer 30 on a cycle that is shorter than the incubation period for hatching mosquito eggs, i.e. shorter than the time from when the mosquito lays the eggs until the eggs hatch. Thus, the water and mosquito eggs and any larvae that may be present in the water are dumped from the trays 12, as shown in FIGS. 5 and 9.

Referring now again to FIG. 3, when the water, eggs and larvae are dumped out of the trays 12, they fall downward and are received in a catch bowl 36. The contents of the catch bowl 36 flows via gravity out a bottom opening 38 of the catch bowl 36 and through a distribution channel 40 onto a belt filter 42. The belt filter 42 is preferably constructed of a woven metal mesh that has sufficiently small openings so that mosquito eggs and larvae are retained on the belt filter 42 while the water flows through the belt filter 42 and is caught in a filtered water tank 44 located below the belt filter 42.

Referring now to FIGS. 10 through 14, the belt filter 42 retains the mosquito eggs and larvae as the water flows through the belt filter 42. The belt filter 42 is provided with sides 46 that have gear opening 48 therein. The gear openings 48 are engaged and driven by drive gears 50, causing the belt filter 42 to travel between a pair of closely spaced rollers 52A and 52B that smash and destroy the eggs and larvae that are retained on the belt filter 42. The debris from the smashed eggs and larvae travels past a brush 54 that sweeps the debris off of the belt filter 42. The debris falls off of the belt filter 42 and the brush 54 via gravity into a sludge tank 56 located below the edge 58 of the belt filter 42, and the belt filter 42 then travels back to its starting point, i.e. under the distribution channel 40. Liquid contained in the debris flows via gravity out of the sludge tank 56 into an evaporating tray 60 where the liquid is evaporated with the aid of heat supplied by sunlight that passes through a magnifying glass panel 62 and is focused on the evaporating tray 60. The magnifying glass panel 62 is preferably a dome shape and a multifaceted design to allow continuous heating of the evaporating tray 60 while the sun moves through the sky. Dried debris will periodically be manually removed from the sludge tank 56 during normal maintenance checks of the device 10.

The filtered water tank 44 is provided with a tank float switch 64 that regulates the flow of water out of the filtered water tank 44 and back to the reserve water storage tank 14 which in turn supplies water to a catch tank 66 that supplies water to the unit 11. The catch tank 66 supplies water to the trays 12 via a tray float valve 68 that is provided on each tray 12 and supplies water via water lines 67 to maintain fluid pressure on the pancake cylinder 28 until a sequence valve 70 that is activated by the timer 30 causes the fluid pressure to drain off the pancake cylinder 28, as will be more fully described hereafter.

Prior to the time required for mosquito eggs to hatch, the unit 11 automatically dumps the water and eggs from the trays 12 and refills the trays 12 with water by completing a cycle of the device 10. At predetermined time intervals, the timer 30 and sequence valve 70 operate to release the water pressure that normally holds the pancake cylinder 28 in an upwardly extended orientation. The water pressure drains from the pancake cylinder 28 at a regulated flow, in turn causing rods 34 that attach the pancake cylinder 28 to each of the tray's flexible side lip 24 to drop. When the flexible side lips 24 drop, the larva and egg laden water that were contained on the tops 26 of the trays 12 spill over the flexible side lips 24 of the trays 12 activating the tray float valves 68 located on each individual tray 12. The top 26 of each tray 12 is divided into pie shaped wedges 69 which are sloped downward from a center support 71 for the tray 12 to the flexible side lip 24 of the tray 12. The center support 71 holds the trays on top of each other in spaced apart relationship. The pie shaped wedges 69 facilitate complete draining of the contents of the tray 12 when the flexible side lip 24 is lowered. Activation of the tray float valves 68 opens spray nozzles 72 that are located immediately above each tray 12 and starts a water pump 74, causing water to flow from the catch tank 66 to the spray nozzles 72. The spray nozzles 72 cast a pattern of rinse water onto the top 26 of each tray 12, thereby flushing any eggs or larvae off of the trays 12.

Then the timer 30 and sequence valve 70 once again cooperate to allow water pressure to return to the pancake cylinder 28, causing the pancake cylinder 28 to rise slowly. This in turn raises the rods 34 and the flexible side lips 24 of the trays 12, allowing the trays 12 to refill with water supplied via the tray float valves 68 and associate spray nozzles 72. As each of the trays 12 refill completely with water, the associated tray float valve 68 shuts off flow of water to its spray nozzle 72. Next, the filtered water tank 44 empties through the water pump 74 into the reserve water storage tank 14. A tank float valve 76 provided in the catch tank 66 serves to allow the catch tank 66 to refill with water flowing via gravity from the reserve water tank 14. Once the filtered water tank 44 is empty, the tank float switch 64 provided on the filtered water tank 44 is then actuated to turn off the water pump 74, thereby completing one cycle of operation of the device 10.

The tray float valves 68 that are provided on the individual trays 12 also serve to keep the individual trays 12 filled with water between cycles when the water levels in the trays 12 fall due to evaporation. Also, although not illustrated, when the device 10 is to be used in remote areas, the reserve water storage tank 14 may be provided with means for passive refilling by collection of rain water, such as for example a funnel that feeds rainwater into the tank 14.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A device for eliminating mosquitos comprising:
    a unit containing multiple trays with each tray capable of retain water on a top of the tray, means for repeatedly dumping the contents of the trays and means for repeatedly refilling the trays with water,
    a timer for periodically activating dumping of the trays and refilling them with water,
    a belt filter for filtering the contents of the trays when they are dumped, said belt filter having a filter medium of sufficient size to retain mosquito eggs and mosquito larvae on the belt filter while allowing water to pass through the belt filter, said belt filter passing between means for crushing any mosquito eggs and mosquito larvae that are retained on the belt filter,
    the means for repeatedly dumping the contents of the trays further comprising a sequence valve attached to and activated by the timer, said sequence valve connected between a water supply and a pancake cylinder to and regulating fluid pressure to the pancake cylinder, said pancake cylinder mechanically connected to a lift disk, and
    said lift disk attached via rods to a flexible side lip provided on the perimeter of each said tray so that the trays hold water when the lips are raised and are dumped of their contents when the lips are lowered.

2. A device for eliminating mosquitos according to claim 1 wherein the means for repeatedly refilling the trays with water further comprises:
    a tray float valve provided on each tray, each said tray float connected between the water supply and a spray nozzle and regulating flow of water to the spray nozzle that serves to spray water on its associated tray to flush the contents of the tray when the lip of the tray is lowered and to refill the tray after the lip of the tray is again raised.

3. A device for eliminating mosquitos according to claim 2 wherein the means for crushing any mosquito eggs and mosquito larvae that are retained on the belt filter further comprises:
    a pair of closely spaced rollers provided on either side of the filter belt, and gears for moving the filter belt between the rollers so that the rollers crush any mosquito eggs and mosquito larvae that are retained on the belt filter.

4. A device for eliminating mosquitos according to claim 3 further comprising:
    a brush provided at an edge of the belt filter and located above a sludge tank for brushing debris off of the belt filter and into the sludge tank after the belt filter and any mosquito eggs and mosquito larvae retained thereon have passed between the pair of rollers.

5. A device for eliminating mosquitos according to claim 4 further comprising:

an evaporating tray connected to said sludge tank so that liquid from the sludge tank flows to the evaporating tray where the liquid evaporates.

6. A device for eliminating mosquitos according to claim 5 further comprising:

a magnifying glass panel positioned relative to the evaporating tray so that the magnifying glass panel focuses sunlight onto the evaporative tray to heat it.

7. A device for eliminating mosquitos according to claim 2 wherein the water supply further comprises:

a filtered water tank located under said belt filter to receive water that passes through said belt filter, a reserve water storage tank connected to the filtered water tank for receiving water from the filtered water tank, said reserve water storage tank connected to a catch tank for supplying water to said catch tank, and said catch tank attached to a water pump that supplies water to said pancake cylinder and said spray nozzles.

8. A device for eliminating mosquitos according to claim 1 further comprising:

a top of each tray being sloped downward toward its flexible lip.

9. A device for eliminating mosquitos according to claim 8 further comprising:

the top of each tray being composed of sloped pie shaped wedges.

10. A device for eliminating mosquitos according to claim 9 further comprising:

a central support that is provided attached to the center of each tray for holding the trays on top of each other and held in spaced apart relationship.

* * * * *